April 1, 1941. A. F. JELINEK' ET AL 2,237,183
CLUTCH OPERATING MECHANISM FOR AUTOMATIC SCREW MACHINES
Filed March 4, 1940 4 Sheets-Sheet 1

INVENTORS
ALFRED F. JELINEK &
WALTER E. GROSS,
BY
ATTORNEYS

April 1, 1941.   A. F. JELINEK ET AL   2,237,183
CLUTCH OPERATING MECHANISM FOR AUTOMATIC SCREW MACHINES
Filed March 4, 1940   4 Sheets-Sheet 2
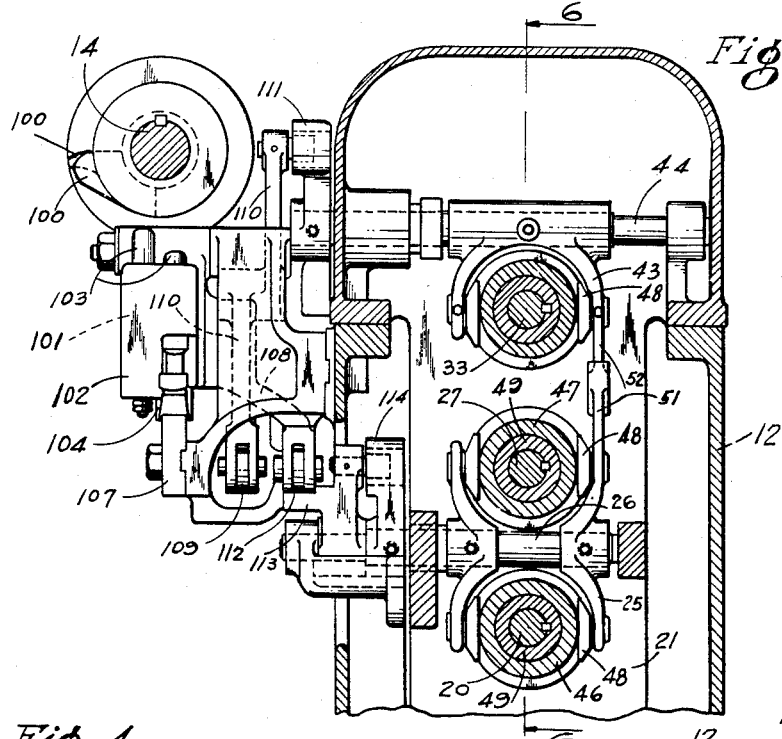
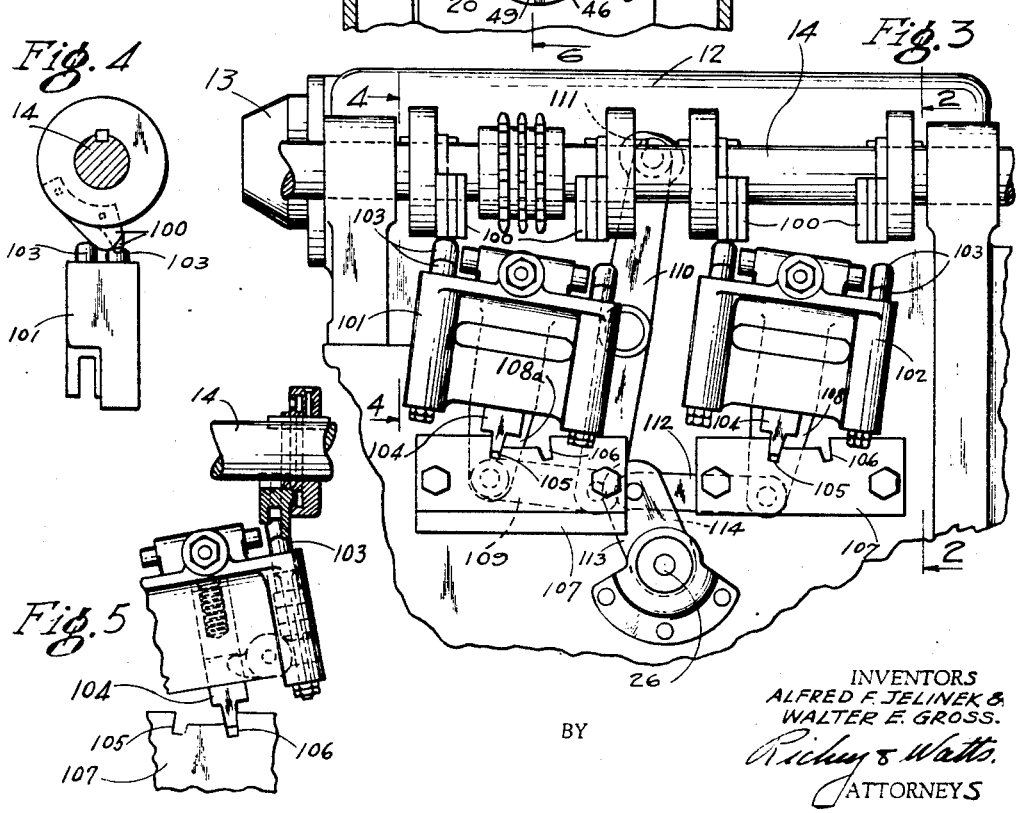
INVENTORS
ALFRED F. JELINEK &
WALTER E. GROSS.
BY
ATTORNEYS April 1, 1941.    A. F. JELINEK ET AL    2,237,183
CLUTCH OPERATING MECHANISM FOR AUTOMATIC SCREW MACHINES
Filed March 4, 1940    4 Sheets-Sheet 3

INVENTORS
ALFRED F. JELINEK &
WALTER E. GROSS.
BY Richey & Watts
ATTORNEYS

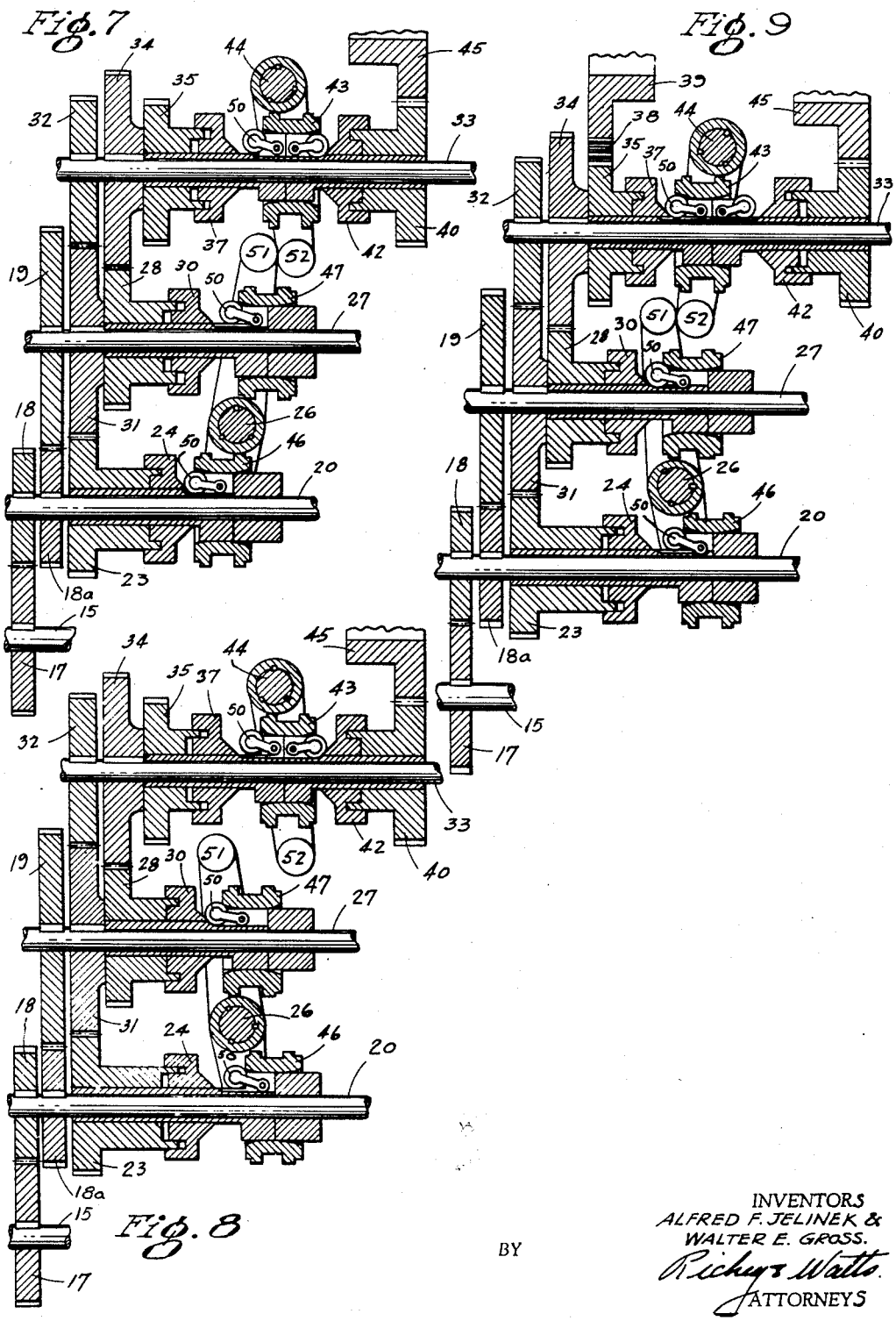

UNITED STATES PATENT OFFICE 2,237,183

CLUTCH OPERATING MECHANISM FOR AUTOMATIC SCREW MACHINES

Alfred F. Jelinek and Walter E. Gross, Cleveland, Ohio, assignors to The Cleveland Automatic Machine Company, Cleveland, Ohio, a corporation of Ohio Application March 4, 1940, Serial No. 322,185

4 Claims. (Cl. 29—43)

This invention relates broadly to automatic screw machines and more specifically to improvements in the mechanism for controlling the speed and direction of rotation of the spindle.

The primary object of the invention is to provide a clutch operating mechanism which is constructed to facilitate operation of the clutch through certain cycles of operation, but which will arrest the actuation thereof in the event adjustments are made which would change the direction of rotation of the spindle when the machine is being operated in high gear.

In detail, the clutch control mechanism contemplated herein comprises a pair of arms organized to facilitate the operation of the clutches for effecting transmission of power between the low and high speed gearing, the low and reverse gearing, but which will restrain operation of the clutch for reversing the direction of rotation of the spindle when the driving connections are coupled to effect the high speed forward rotation of the spindle.

Other objects and advantages more or less ancillary to the foregoing and the manner in which all the various objects are realized will appear in the following description.

Referring to the drawings in which the preferred embodiment of the invention is illustrated:

Fig. 2 is a transverse sectional view through the screw machine illustrated in Fig. 1, the section being taken on the plane indicated by the line 2—2 in Fig. 1;

Fig. 3 is an elevational view of the fragmentary portion of the clutch operating mechanism illustrated in Fig. 2;

Fig. 4 is a vertical sectional view taken on the plane indicated by the line 4—4 in Fig. 3 showing the structure of one of the operating cams and the plungers associated therewith;

Fig. 5 is a vertical sectional view of the cam mechanism illustrated in Fig. 4, and a fragmentary portion of the mechanism operated thereby;

Figure 6:
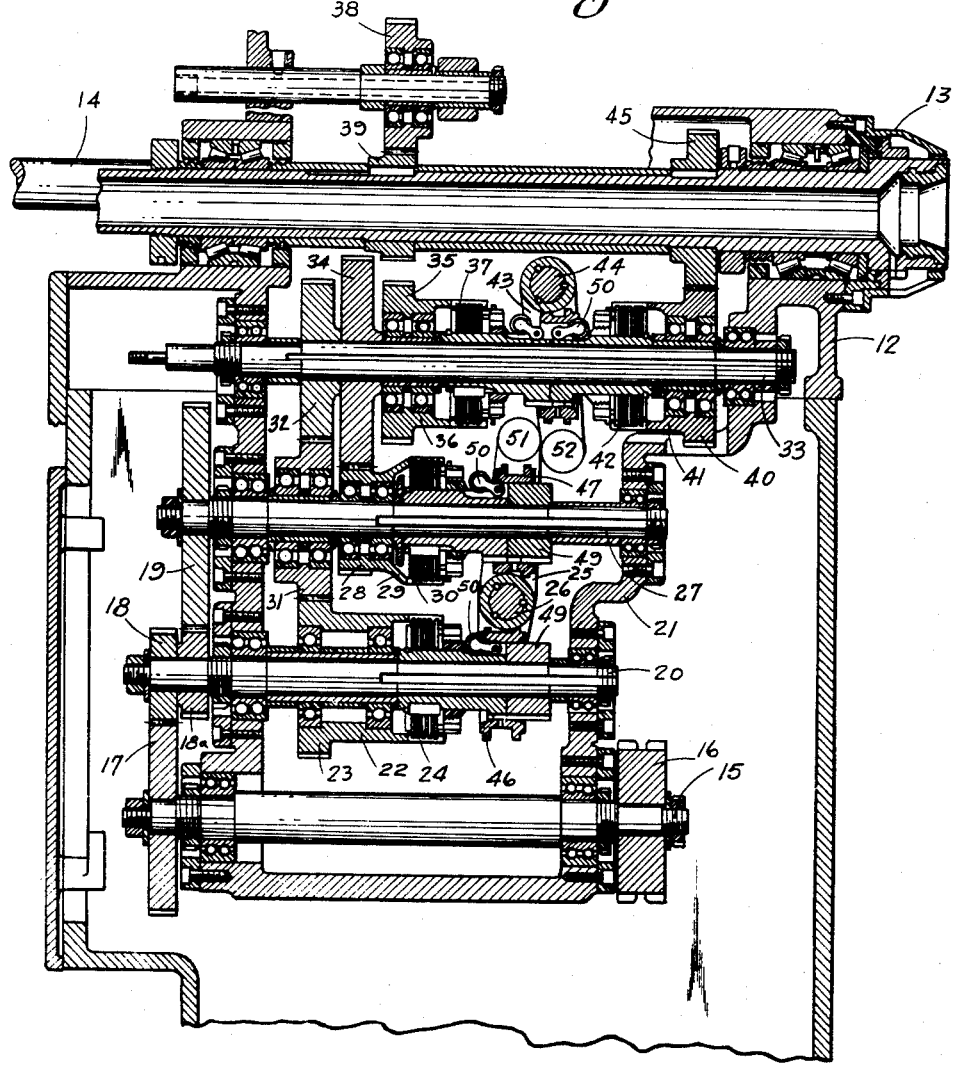

Fig. 6 is a vertical sectional view of the clutch actuating members and associated gearing within the machine, the section being taken on the plane indicated by the line 6—6 in Fig. 2; and Figs. 7, 8 and 9 are sectional views shown somewhat diagrammatically of the clutch actuating mechanisms illustrated in Figs. 2 and 6.

Figure 1:
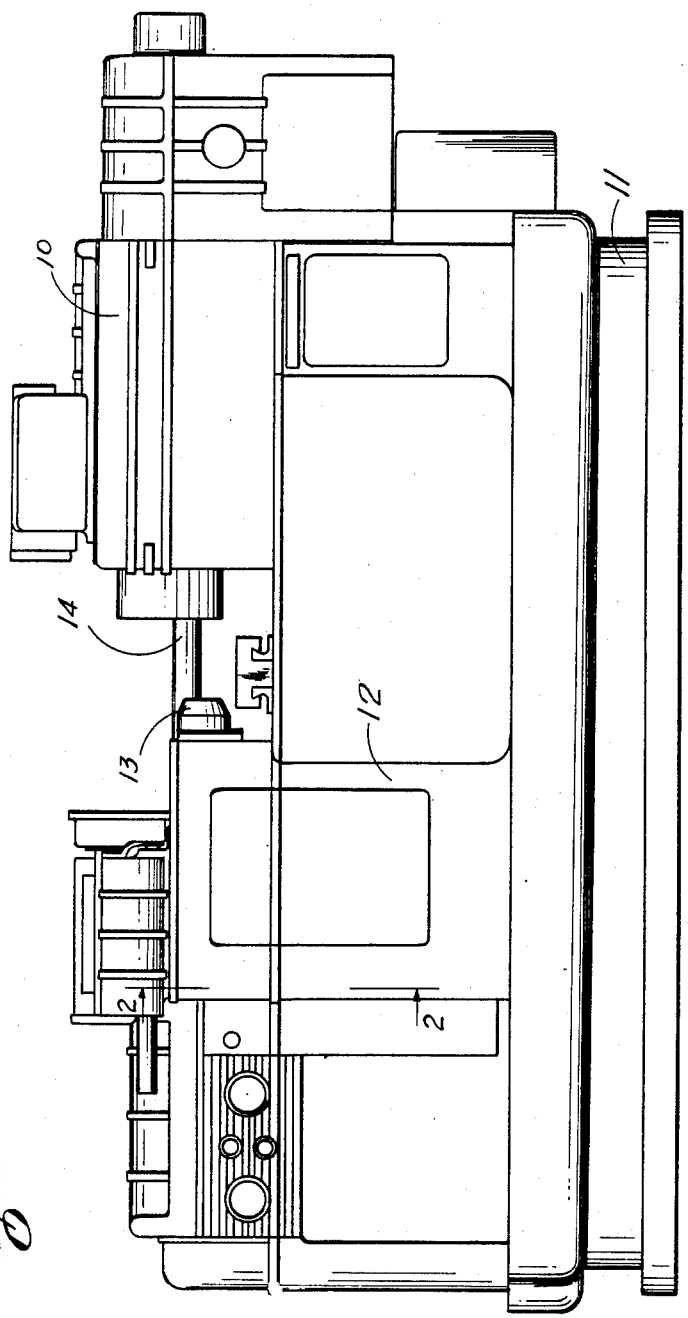
Fig. 1 is an elevational view of an automatic screw machine embodying the improved clutch operating control mechanism.

Referring first to Fig. 1, the screw machine 10, chosen herein for purposes of illustration only, comprises a base 11, a housing 12, adapted to support the driving connections from the source of power to the work holding spindle 13 and the control mechanism coordinated with the cam shaft 14. The spindle 13 in the instant case is driven through a gear train (see Fig. 6) comprising generally a drive shaft 15 having a sprocket 16 keyed thereon, which is coupled to an electric motor, not shown, a spur gear 17 keyed to the opposite end thereof constituting in conjunction with the pinions 18, 18a and gear 19 the speed change gearing commonly employed in machines of this character. The pinion 18 is keyed to a countershaft 20 mounted in bearings in a frame 21 which is supported within the housing 12. Upon the countershaft 20 there is a sleeve 22 having a spur gear 23 formed thereon and a clutch member 24 coordinated therewith, which is controlled through a shifter fork 25 mounted for oscillatory movement upon a shaft 26 superjacent the shaft 20. The shaft 20 and gears 18, 18a and 23 constitute the primary driving element for effecting the high speed forward drive of the spindle 13. Above the shaft 20 there is a second countershaft 27 adapted to support the speed change or so called "pick-off" gear 19 and a gear 28 formed in a sleeve 29 which is coordinated with a clutch member 30. The clutch 30 is operably controlled through the yoke or shifter fork 25 fulcrumed upon the shaft 26 as will be seen more clearly by reference to Fig. 2. The shaft 27 and gears 19 and 28 constitute the primary driving element for effecting the low speed forward drive of the spindle 13.

The shaft 27 is also provided with an idler gear 31 which is intermeshed with the gear 23 and a gear 32 keyed upon a third countershaft 33 disposed above the shaft 27 and parallel therewith. Adjacent the gear 32 and keyed to the countershaft 33 there is a drive gear 34 intermeshed with the gear 28 formed in the sleeve 29. The shaft 33 further supports the gear 35 formed in a sleeve 36 which is coordinated with a clutch 37 for controlling the operation thereof.

The gear 35 is meshed with a reverse idler gear 38, intergeared with a pinion 39 keyed upon the work holding spindle 13. The idler gear 38 is supported on a jack shaft mounted in the housing 12 rearward the shaft 33, the idler gear and supporting structure therefor being shown in Fig. 6, as revolved through an angle of 90° in order to illustrate with greater clarity the relation of the idler gear with the pinion 39. Upon the inner end of the countershaft 33 there is a drive gear 40 machined in the periphery of a sleeve 41 having a clutch member 42 coordinated therewith. This clutch is controlled by a shifter fork 43 mounted on a rocker shaft 44 disposed between the clutches 42 and 37 and arranged so that the shifter fork when oscillated will effect the alternate engagement of the two clutch members. The gear 40 is intermeshed with a gear 45 keyed to the spindle 13, this gear together with the clutch 42 and the gear train coordinated therewith constitute the forward driving mechanism for the spindle 13 heretofore referred to. The gear 39, idler 38, gear 35 together with the clutch 37 and gear train coordinated therewith constitutes the reverse driving mechanism for the spindle. The clutches 24 and 30 are operably controlled by the shifter fork 25 which is arranged between the clutch actuating collars 46 and 47 and connected thereto through the engagement of the shoes 48 within the grooved faces of the collars. The clutch actuating collars 46 and 47 are keyed to the sleeves 49 secured to the countershafts 20 and 27. Within the bores of the collars 49 and supported in the hubs of the clutches there are pawls 50 having rollers mounted on the outer ends thereof, which are engageable with the actuating plates embodied in the clutch assemblies. As the shifter forks are oscillated upon their bearing supports the collars are reciprocatively actuated upon the hubs of the clutches, thus effecting the driving connection within the clutches and the consequent rotative movement of the gears entrained therewith.

As illustrated in Figs. 2 and 6, the shifter forks 25 and 43 are formed with arms 51 and 52 respectively extending towards each other and adapted for abutting engagement when the forks 25 and 43 are rocked to effect engagement of the clutch 37 for reversing the direction of rotation of the spindle while the high speed forward drive clutch 24 is engaged. Further, and as will be seen in the diagrammatic views illustrated in Figs. 7, 8 and 9, the arms 51 and 52 are arranged to afford actuation of the clutches controlling the forward high speed rotation of the spindle, low speed forward rotation of the spindle and reversal of the direction of rotation of the spindle when and only when the clutches are engaged to effect the low speed rotative drive thereof. Thus, as shown in Fig. 7 where the clutches 24 and 42 are positioned to effect the high speed forward drive of the spindle, application of power is derived through the gears 17, 18 and 18—a to the shaft 20 through the engaged clutch 24 to the pinion 23, the idler 31 and gear 32 to the shaft 33 where the driving effort is communicated through the engaged clutch 42 to the pinion 40 and in turn to the drive gear 45 keyed to the work holding spindle 13. With the clutches so engaged it will be seen that the arm 52 is rocked sidewise in the same direction as the arm 51 and no interference between the arms will occur with the clutches so engaged.

When low speed driving connection is effected the transmission of power is derived through the gears 17, 18, 18—a and 19 to the shaft 27, thence through the clutch 30 and pinion 28, to the gear 34 keyed upon the shaft 33. When the clutch 42 is adjusted, as shown in Fig. 8, to complete the operative driving connection power from the shaft 33 is transmitted through the clutch and pinion 40 to the drive gear 45 and in turn the spindle 13. Here, it will be noted, the arms 51 and 52 are moved in opposite directions and no interference occurs with the clutch thus engaged.

The reverse gear driving connections are effected by the power emanating from the main drive shaft 15 to the gear 17, pinions 18 and 18—a, gear 19 to the shaft 27, thence through the clutch 30, pinion 28 and gear 34 to the shaft 33 where the power is transmitted through the clutch 37 and pinion 35 to the idler 38 and in turn the pinion 39 keyed upon the drive spindle 13. By reference to Fig. 9, it will be seen that the arms 51 and 52 are designed to permit actuation of the shifter forks to effect such clutch adjustment, but, as will be seen, by compression of the position of the arms 51 and 52 in Figs. 7 and 9, if an attempt were made to reverse the direction of rotation of the spindle while the forward high speed where the clutch 24 is engaged (see Fig. 7) and the arm 51 is inclined to the right, the arm 52 as it is swung to the left during the engagement of the reverse clutch 37 (Fig. 9) would strike the arm 51 and disengage the high speed driving clutch 24, or if the parts were snugly filled in their bearings the arm 51 would arrest movement of the shifter fork 43.

In the present embodiment the clutches 24, 30, 42 and 37 are automatically controlled through linkage coordinated with cam mechanism mounted upon the main cam shaft 14 of the machine. The actuating mechanism for effecting such automatic operation is generally of the structure illustrated in Patent No. 2,152,044 dated March 28, 1939, entitled "Automatic clutch shifter" issued to Gross and Jelinek. Briefly, the linkage connections embodied in the automatic control mechanism comprise a series of cams 100 mounted upon the cam shaft 14 organized for engagement with a pair of plunger heads 101 and 102 pivotally mounted upon the housing 12. The heads are bored throughout their length for the reception of spring pressed plungers 103 adapted within the cyclic movement of the cams, to effect the oscillation of the heads and the successive elevation of the finger 104 from the notches 105 and 106 in the keeper plate 107. The heads 101 and 102 are formed with depending arms 108 and 108—a operatively connected to the shifter forks 25 and 43. The arm 108—a formed in the head 101 is pivotally connected with a link 109 fulcrumed within the yoked end of a lever 110 pivoted to an arm 111 affixed upon the rod 44. Oscillation of the arm 111 initiated by operation of the cam and coordinated linkage effects the oscillation of the shifter fork 43 and consequent actuation of the clutches 37 and 42. The arm 108 formed in the head 102 is pivotally connected with a link 112 fulcrumed in the yoked end of an arm 113 connected with an arm 114 fixed upon the rod 26 which supports the shifter fork 25 for controlling the clutches 24 and 30.

The arms 51 and 52 as coordinated with the automatic control mechanism heretofore described are provided to safeguard the working parts of the machine from injury when adjustments are made by a mechanic or "set up man" who may have occasion to alter the positions of the cams 100 and who might inadvertently arrange the cams in a position which would cause the direction of rotation of the spindle to be reversed while the machine is operating in forward high speed gear. Obviously, such an inadvertent adjustment cannot occur in a machine provided with the mechanisms contemplated herein since the arm 52 is designed to strike the arm 51 and disengage the high speed forward drive clutch when the reverse drive gearing is entrained.

It will be understood that the invention is susceptible for use in a machine having a manually controlled clutch actuating mechanism and that the application of the invention is not to be construed as limited to a machine which is constructed with an automatic power actuated clutch control mechanism as described above.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

We claim:

1. In a screw machine embodying a cam shaft, a work holding spindle and gearing to effect variable forward speeds and the reverse of said spindle, clutches coordinated with said gearing, shifter forks coordinated with said clutches, plungers operatively connected with said shifter forks, cams on said cam shaft for actuating said plungers and arms on said shifter forks disposed to swing clear of each other when shifting the clutches for the forward drive gears and to abut one another when shifting the clutches from the high speed drive to the reverse drive gearing.

2. A screw machine having a work holding spindle, a high speed forward drive gear train and a reverse drive gear train, clutches interconnecting the gears in said gear trains, shifter forks coordinated with said clutches, arms on said shifter forks and means associated with said shifter forks for actuating said arms to inhibit the operation of the clutches associated with the high speed forward drive gear train and the reverse drive gear train.

3. A screw machine embodying a work holding spindle and a variable speed forward and reverse drive gearing, a clutch coordinated with the forward high speed drive gearing, a clutch coordinated with said reverse drive gearing, shifter forks associated with said clutches, arms on said shifter forks, said arms disposed to abut one another and disengage the clutch coordinated with the forward high speed drive gearing prior to engagement of the clutch coordinated with the reverse drive gearing.

4. A screw machine having a work holding spindle and a plurality of drive gear trains mounted therein, a clutch coordinated with one of said drive gear trains to effect the high speed forward drive of the spindle, a clutch coordinated with another of said drive gear trains to effect the low speed forward drive of said spindle, a clutch coordinated with another of said drive gear trains to effect the reverse drive of said spindle, control members for operating said clutches and arms on said control members to arrest the operation of the clutch coordinated with the drive gear train for operating the reverse drive of the spindle when the clutch coordinated with the drive gear train for operating the high speed forward drive of the spindle is engaged.

ALFRED F. JELINEK.
WALTER E. GROSS